United States Patent [19]

Keller

[11] 4,206,999

[45] Jun. 10, 1980

[54] METHOD AND APPARATUS FOR ASCERTAINING THE MAGNITUDE AND DIRECTION OF THE FLOW SPEED IN A FLOWING MEDIUM

[76] Inventor: Andreas Keller, Dr. Wiggerstrasse 1, D-8100 Garmisch-Partenkirchen, Fed. Rep. of Germany

[21] Appl. No.: 886,350

[22] Filed: Mar. 14, 1978

[30] Foreign Application Priority Data

Mar. 21, 1977 [DE] Fed. Rep. of Germany ....... 2712255

[51] Int. Cl.$^2$ ............................................... G01P 3/36
[52] U.S. Cl. ...................................... 356/28; 356/336; 356/338
[58] Field of Search ................... 356/28, 27, 157, 158, 356/159, 160, 335, 336, 339, 340, 342

[56] References Cited

U.S. PATENT DOCUMENTS

| | | | |
|---|---|---|---|
| 2,866,935 | 12/1958 | Robillard | 356/27 |
| 3,511,150 | 5/1970 | Whitney et al. | 356/28 |
| 3,525,569 | 8/1970 | Gamertsfelder et al. | 356/28 |
| 3,966,324 | 6/1976 | Iten | 356/28 |
| 4,126,392 | 11/1978 | House | 356/28 |

Primary Examiner—S. C. Buczinski

[57] ABSTRACT

The invention relates to a method for determining the magnitude and direction of the flow speed in a flowing medium comprising the following steps:
(a) Irradiating the flowing medium in a first direction with a laser beam of a defined cross-section having a maximum principal dimension;
(b) Observing a defined position (measured volume) in the longitudinal extent of the laser beam in a second direction at a defined angle to the first direction;
(c) Measuring the pulse duration of diffuse light pulses given off in the second direction by particles of a defined size contained in the flowing medium and passing through the measured volume; and
(d) Turning the laser beam cross-section about the rotary axis defined by the first direction until diffuse light pulses of maximum pulse duration can be observed.

By means of this method one obtains in a single measuring operation an indication of the magnitude and direction of flow in the plane formed by the laser beam and the flow direction.

10 Claims, 4 Drawing Figures

FIG. 3
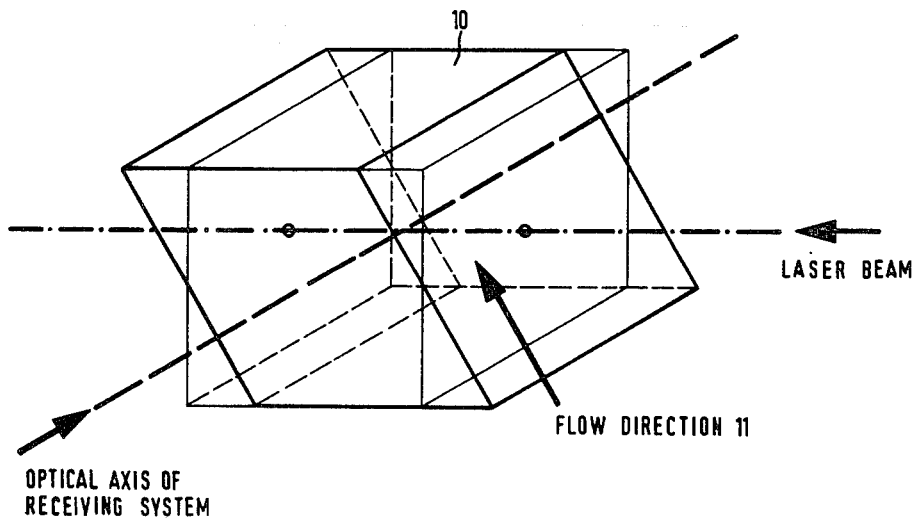
LASER BEAM
FLOW DIRECTION 11
OPTICAL AXIS OF
RECEIVING SYSTEM
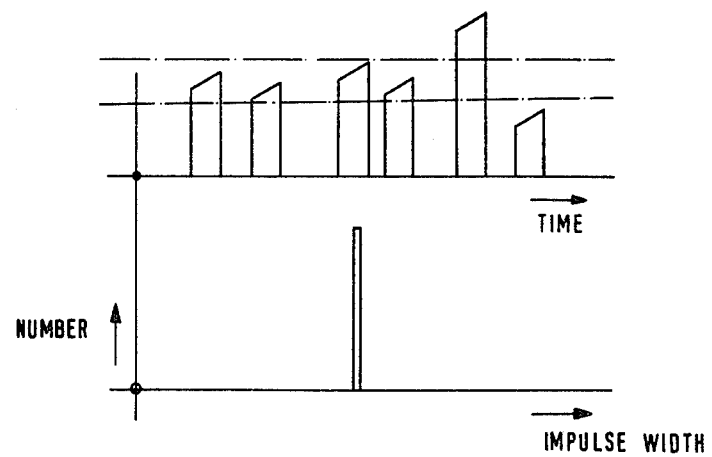
FIG. 4

METHOD AND APPARATUS FOR ASCERTAINING THE MAGNITUDE AND DIRECTION OF THE FLOW SPEED IN A FLOWING MEDIUM

The invention relates to a novel method and associated apparatus for determining the magnitude and direction of the flow speed of a flowing medium.

The knowledge of the flow behaviour of a flowing medium, particularly in the vicinity of bodies that are swept by the flow, plays an important part in a multitude of technical and physical connections. Nevertheless, to this day it has not been possible to develop a simple method and a simple apparatus for determining the flow speed of flowing media and permitting the rapid and simple measurement at a particular position of the magnitude and direction of the local flow speed so as to enable one to determine the velocity pattern of the flowing medium by a plurality of like measurements. It is known to determine the velocity vector of a flowing medium by means of dynamic pressure types which can be turned in various directions. However, to enable measurement of the velocity vector in three dimensions, three components of the velocity vector must be determined, this requiring the provision of a correspondingly large number of degrees of freedom of the dynamic pressure pipe measuring means or a correspondingly larger number of dynamic pressure pipes in the directions of the components. In practice, this is too costly in most cases and in some cases it cannot even be carried out. In addition, the dynamic pressure pipes might themselves falsify the flow because they penetrate into the medium.

It is an object of the invention to provide a novel method and means for determining the magnitude and direction of the flow speed and permitting the velocity vector of the flowing medium to be determined at a particular location in two or even only one measuring step without interfering with the flow.

The method according to the invention provides for the following steps:

(a) Irradiating the flowing medium in a first direction with a laser beam of a defined cross-section having a maximum principal dimension;

(b) Observing a defined position (measured volume) in the longitudinal extent of the laser beam in a second direction at a defined angle to the first direction;

(c) Measuring the pulse duration of diffuse light pulses given off in the second direction by particles of a defined size contained in the flowing medium and passing through the measured volume; and (d) Turning the laser beam cross-section about the rotary axis defined by the first direction until diffuse light pulses of maximum duration can be observed.

The invention first of all utilises the knowledge that every flowing medium contains particles, germs, gas bubbles, suspended matter or the like, the size of which is in the order of a few microns. The magnitude and direction of the motion of these particles are identical with the flow speed of the medium. Particles which penetrate the measured volume being observed give off a diffuse light impulse of which the duration depends on the length of the measured path in the measured volume and the speed of the particle. Observation of the measured volume is effected by means of an optical receiver, the measured volume being represented as a sectioned figure of the laser beam with the trace of the rays of the optical receiver. The magnitude of the measured volume is therefore known. By selecting a special laser beam cross-section, which must not be circular symmetrical but have a maximum principal dimension, particles in the measured volume remain therein for differently long durations depending on the direction in which the measured volume is penetrated. If one turns the laser cross-section so that the direction of penetration is parallel to the direction of the maximum principal dimension, the particles remain in the measured volume for a maximum time and one therefore obtains a maximum pulse duration of the observed diffuse light pulses. The pulse width is a measurement of the magnitude of the flow speed which can be determined from the magnitude of the known measured volume; the direction of flow is recognizable from the position of the maximum principal dimension of the laser beam cross-section relatively to a predetermined zero position.

By means of the proposed method one already obtains in a single measuring step an indication of the magnitude and direction of flow in the plane formed by the laser beam and the flow direction. Now, in order to determine the spatial position of the velocity vector, one can proceed in a manner such that, after observing and measuring diffuse light pulses of maximum pulse duration, the rotary position of the laser beam cross-section used for this purpose is registered, the laser beam direction (first direction) and the direction of observation (second direction) are interchanged and steps b to d of the aforementioned method are carried out with the first and second directions interchanged. In this way one again obtains an indication of the flow direction and speed in a plane formed by the flow direction and the laser beam, so that the velocity vector can be determined at the location of the measured volume by the line of intersection of the two planes.

However, in a particularly preferred embodiment of the method according to the invention it is possible to obtain the velocity vector in practically one measuring step. The procedure is that the defined position (measured volume) of the laser beam is observed through an observation cross-section which likewise has a maximum principal dimension. Following the observation of diffuse light pulses of maximum pulse duration in accordance with the previously explained method steps a to d, the observation cross-section is turned about the observation axis (second direction) until diffuse light pulses of maximum pulse duration are again observed. In this way the spatial flow direction can be determined by the position of the maximum principal dimension of the laser beam cross-section and by the position of the maximum principal dimension of the observation cross-section, in each case referred to a predetermined zero position. The magnitude of the speed is obtained from the width of the measured diffuse light pulses.

The apparatus according to the invention for determining the magnitude and direction of the flow speed in a flowing medium is characterised by a laser for illuminating a limited measured volume in the flowing medium, by an optical receiver which is disposed at a defined angle to the laser beam direction, is directed to the measured volume and is connected to a photo-multiplier and means downstream of the photo-multiplier for measuring the pulse width of the pulses given off by the photo-multiplier, and by means for determining the position of the laser beam cross-section, said means being associated with the laser, rotatable about the laser beam axis and comprising an element shaping the laser beam cross-section.

A measuring apparatus comprising a laser and an optical receiver with connected photo-multiplier for defining a measured volume that is to be observed in a flowing medium is known per se (see German Gebrauchsmuster Specifications 7 527 048 and 7 527 084). However, this known apparatus serves to determine the so-called cavitation germ spectrum of a liquid, wherein the number and size of cavitation germs contained in the liquid are determined to obtain an indication of the cavitation germ content and thus the cavitation behaviour of the liquid. The time for which the germs are in the measured volume, equivalent to the impulse width of the diffuse light pulses received, is immaterial in this known measuring apparatus.

The invention is based on the recognition that the measured volume which is also necessary in the known apparatus can itself be utilised in the previously described method for measuring the flow direction and speed of the flowing medium. Experience obtained with the apparatus for determining the so-called cavitation germ spectrum shows that it is readily possible to define a measured volume of known size as a sectional figure between the laser beam and the trace of the rays of the optical receiver in the medium and to keep the measured volume so small that at any instant the measured volume contains only one particle giving off diffuse light. By means of the concept of shaping the laser beam cross-section so that it has a maximum principal dimension and to turn the position of this cross-section about the laser beam axis to determine the maximum time for which a particle is in the measured volume and thereby draw a conclusion about the speed of flow, the advantages of the known apparatus for measuring the cavitation germ spectrum are applied to a completely novel method of measuring the velocity.

As previously explained in connection with the method, the measuring apparatus according to the invention permits the determination of the magnitude of the flow speed in a single measuring step as well as a plane in which the flow takes place, i.e. two components of the velocity vector. To enable the third component, i.e. the spatial flow, also to be detected, the apparatus can be constructed so that the laser and the optical receiver are interchangeable in their mutual position. With this construction the location of the measured volume is retained (at the point of intersection of the laser axis and the observation axis); only the form of the measured volume is turned about the angle that the axes define between one another.

In a preferred embodiment which permits all three components of the velocity vector to be detected in a single measuring step, however, the apparatus is constructed so that the optical receiver comprises a slit diaphragm which is rotatable about the optical axis of the optical receiver and the rotary position of which can be read off and/or scanned. As likewise already described, the flow direction is then determined from the position of the element shaping the laser beam cross-section and the split diaphragm in relation to predetermined zero positions.

The hereinbefore described basic principle of measurement according to the invention can be improved so that a direct indication of the flow speed and direction is obtainable at the location of the measured volume. It is thus desirable to associate the means for measuring the pulse width with a pulse width analyser, whereby to produce a pulse width histogram. This pulse width histogram enables one to obtain an indication of the velocity distribution. If the pulse width histogram is represented as a sharp peak of a defined pulse width, then this is an indication of laminar flow of substantially constant flow speed and direction. If the histogram is broader, then this indicates speed fluctuations or turbulent flow, the degree of turbulence being ascertainable with the aid of the histogram.

Since a flowing medium contains particles of different size giving off diffuse light of correspondingly different intensity, one can expect the photo-multiplier to give off diffuse light pulses of different height. The pulse height as such has no influence on the measurement that is here to be carried out but a large particle requires more time from the instant of entering the measured volume until it has completely left the measured volume than does a smaller particle of the same speed. Thus, apart from the larger pulse height, a larger pulse width is also the result. Accordingly, should it be found that the flow medium to be observed contains larger particles that could give rise to errors, the resulting source of errors can be simply eliminated by interposing a single channel discriminator. The single channel discriminator selects for measurement only pulses of a defined pulse height or of a narrowly bounded pulse height range so that a clear conclusion can be drawn from the measured pulse width about the speed of the particles in the measured volume. If the diffuse particles are very small in comparison with the dimensions of the measured volume, which is for example the case for smoke particles, consideration of the particle size can be dispensed with.

In many cases it is possible to arrange the measuring apparatus relatively to the flowing medium such that the very adjustment of the element shaping the laser beam cross-section permits determination of the principal plane of flow or a plane that is only slightly inclined thereto so that, in the case of the preferred apparatus having a rotatable slit diaphragm at the optical receiver only slight rotation is to be expected to permit the definite detection of the principal plane of flow. However, should this not be possible it will be advantageous for the pulse width analyser to be preceded by means scanning the rotary position of the slit diaphragm and means for compensating the pulse width variations caused by changes in the measured volume as a result of turning the slit diaphragm. Since the magnitude of the measured volume in the zero position of the slit diaphragm is known and since its position is also given by the rotary position of the element shaping the laser beam cross-section, the variation in the shape of the measured volume as occasioned by turning the slit diaphragm can be predetermined and taken into account in the sense of shortening or lengthening the measured pulse widths.

In a particularly advantageous form of the apparatus according to the invention, provision is made for including a neutral wedge filter or some other unsymmetrical grey filter in the laser beam. By means of this provision the diffuse light pulse of a particle penetrating the measured volume undergoes an intensity increase or reduction over its width depending on its direction of motion and this makes itself evident as a rising or falling flank. The direction of this gradient enables one to recognize in which direction the particle has passed through the measured volume. This is important in cases where the principal direction of flow is not approximately discernable to start with, for example when there is a possibility of reverse flow or the like at bodies that are swept by the flow.

The invention will now be described in more detail with reference to the accompanying drawings, wherein:

FIG. 3 is a very much enlarged diagrammatic representation of the measured volume and its change by turning the split diaphragm associated with the optical receiver, and FIG. 4 illustrates a sequence of diffuse light pulses that corresponds to a laminar flow of constant velocity and the pulse width histogram determined therefrom.

Figure 1:
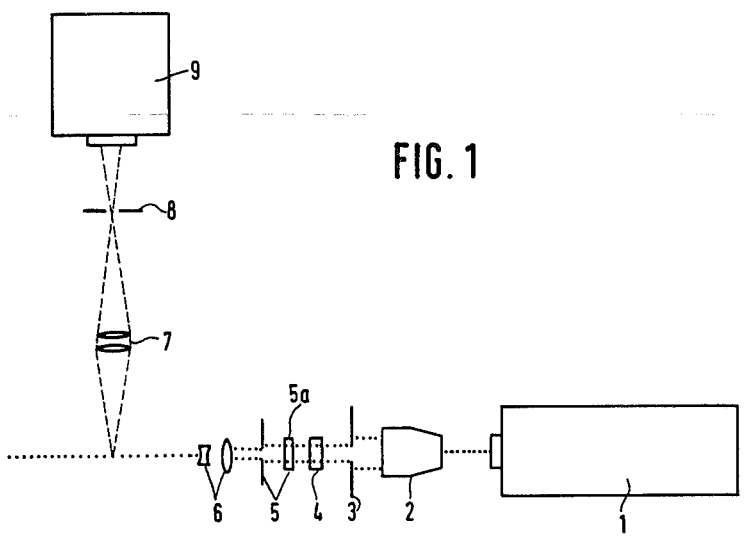
FIG. 1 is a diagrammatic representation of one embodiment of measuring apparatus according to the invention.

The apparatus shown in FIG. 1 comprises a laser 1, a beam diverging optical system 2, a diaphragm 3, a grey filter 4 for making the light intensity of the laser beam uniform over its cross-section, and possibly a condenser 6 for converging the beam. There is also an optical receiver or receiving optical system 7 of which the optical axis is at less than 90° to the laser beam axis and intersects same. The receiver 7 is followed by a slit diaphragm 8 through which the image of the measured volume formed at the location of the point of intersection of the optical axis and laser beam axis is passed to a photo-multiplier 9. Other electronic equipment following the photo-multiplier 9 may for example comprise a single channel discriminator 12 for selecting a defined pulse height or a range of pulse heights, as well as a pulse width analyser 13 with associated indicating and recording means 14. Advantageously, the pulse width analyzer 13 is preceded by scanning means 15 for scanning the rotary position of the slit diaphragm and by a compensator 16 for compensating for pulse width variations caused by changes in the measured volume as a result of turning the slit diaphragm.

The construction of the measuring apparatus described thus far substantially corresponds to the measuring equipment for determining the cavitation germ spectrum (German Gebrauchsmuster Specifications 7 527 048 and 7 527 084). However, the apparatus is made suitable for measuring the flow speed and direction of the observed flowing medium only by means of an element 5 in the form of a diaphragm which is disposed in the path of the laser beam, is rotatable about the laser beam axis and serves to shape the laser beam cross-section. This diaphragm gives the laser beam cross-section a shape having a marked maximum principal dimension. This shape can very simply be a flat rectangle but could also be elliptical, diamond shaped, oval or some other elongate shape.

The element 5 is in addition preceded by a neutral wedge filter 5a which is rotatable therewith and the grey intensity of which preferably increases or reduces in the same direction as that in which the said principal dimension of the aperture of the diaphragm 5 is disposed.

The slit diaphragm 8 associated with the optical receiver 7 is also rotatable about the optical axis and, as do the parts 5 and 5a, has a scale from which to read its rotary position.

To permit the magnitude of the speed to be determined, it is primarily necessary to know the dimensions of the measured volume 10 (FIGS. 2, 3) in the direction of flow. If the precise dimensions of the measured volume 10 cannot be determined greatly, e.g. by a defined trace of the rays, measuring the measured volume, optical enlargement and photographing the measured volume, then calibration of the measuring apparatus shown in FIG. 1 is possible in various ways after the adjustment has been concluded. For example, the measuring apparatus can be calibrated by means of the known quantity and direction of flow in a towing basin, in a cavitation stand, in a wind tunnel or the like. By means of the known flow speed and direction, the pulse duration thus obtained enables one to determine the accurate dimensions of the measured volume.

Another possiblity of calibration consists of moving objects of known size at a known speed in a known direction through the measured volume 10. Advantageous for this purpose is an adjusting apparatus according to German Gebrauchsmuster 7 614 605 which is also utilised in conjunction with the measuring apparatus for determining the cavitation germ spectrum. This apparatus comprises a retaining frame in which one or more wires of known thickness are secured and which is so arranged that the wires can be moved at a known speed and direction through the measured volume. The pulse duration thus obtained again enables the accurate dimensions of the measured volume to be calculated.

A third possibility of calibration consists of ejecting small particles (e.g. smoke particles in gases or latex particles of known size in liquids) from a nozzle at a known speed and direction and allow them to fly through the measured volume 10. From the width of the diffuse light pulses thus obtained one can again calculate the measured volume.

The dimensions of the measured volume 10 must of course be so small that the probability of the measured volume simultaneously containing more than one detectable stray object is less than a small percentage (e.g. 5%). With the aid of optical means, such a limitation is readily possible up to concentrations of $10^5$ particles per $cm^3$.

Figure 2:
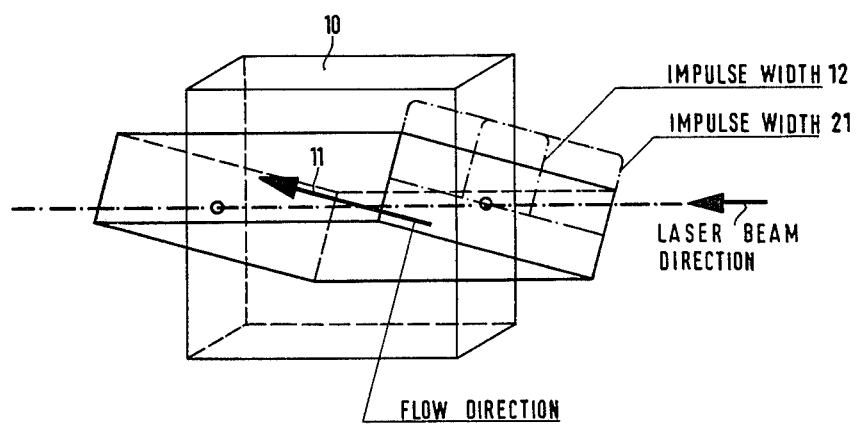
FIG. 2 is a very much enlarged diagrammatic representation of the measured volume and its change by turning the element shaping the laser beam cross-section.

The method of the invention is carried out with the FIG. 1 measuring apparatus in the following manner:

Assume that the medium to be investigated flows with laminar flow of constant velocity in the flow direction 11 (FIG. 2). The particles contained in the medium to be investigated continually pass through the measured volume 10 which is first of all in the zero position shown in weak full lines in FIG. 2. This zero position can be read from the scale on the parts 5, 5a and is determined by the rotary position of these parts. The result is that the particles pass through the measured volume 10 along a path which is projected on the cross-section of the measured volume 10 (laser beam cross-section) as impulse width 12. The photo-multiplier 9 thus delivers pulses having the pulse width 12. If, now, the laser beam cross-section is turned by means of the element 5 in the manner shown in FIG. 2, the maximum principal dimension of the rectangular cross-section, i.e. the longer side of the rectangle, approaches the flow direction until it is parallel thereto. As a result, the particles of the measured volume 10 flow along a path which is projected onto the laser beam cross-section as impulse width 21, the projection corresponding to the length of the rectangular cross-section in the illustrated example. This makes itself evident in a considerable increase in the width of the pulses delivered by the photo-multiplier 9 because now diffuse light will be observed by the optical receiver 7 over the longer residual time of the particles in the measured volume 10. The new rotary position of the element 5 thus gives the position of the plane formed by the direction of flow with the laser beam axis. The width of the pulses (impulse width 21) delivered by the photo-multiplier 9 is a measure of the magnitude of the flow speed. The direction of rise of the oblique flank of the pulse (FIG. 4) occurring by reason of the increasing permeability of the neutral wedge filter 5a in the flow direction 11 gives information about the direction of flow shown by the arrow.

Now, to determine the position of the flow direction in the previously determined plane, the slit diaphragm 8 disposed at the location of the optical receiver at which an image of the measured volume is formed and the aperture width of which determines the dimension of the measured volume 10 is the laser beam direction is turned about the optical axis until the pulses delivered by the photo-multiplier 9 have a maximum width or the pulse width histogram produced by the pulse width analyser reaches a sharp maximum. Since laminar flow with constant speed has been assumed, constant pulse widths are measured which are represented as a sharply limited peak in the pulse with histogram. The dimensions of the measured volume 10 in the flow direction 11 are now constant in relation to the particles passing through the measured volume 10.

From the rotary position of the split diagram 8 one can now read the plane formed by the flow direction 11 and the optical axis of the receiver system 7, 8. The line of intersection of the two determined planes gives the spatial position of the direction of flow and the pulse width of the pulses delivered by the photo-multiplier 9 is a measure of the magnitude of the flow speed.

By means of the above-mentioned procedure, it is possible to detect the flow parameters in a single measurement setting without interference and in punctiform manner, these parameters having previously been determinable with the known measuring method and apparatuses only by means of a three-component measurement.

In the above-described embodiment a laminar flow and a precisely rectangular laser beam cross-section has been assumed for illustrative purposes. Consequently pulses of constant width were measured. If one measures different pulse widths, this is an indication of speed fluctuations or turbulent flow. If one evaluates the signals from the photo-multiplier 9 with the aid of a suitable measured signal analyser, e.g. by producing a pulse width histogram, this will enable the velocity distribution, i.e. the degree of turbulence, to be determined.

The measuring apparatus which has been described above by way of example can be combined with the measuring apparatus for determining the cavitation germ spectrum (Gebrauchsmuster Specification 7 527 084) so that a single apparatus may be used for the simultaneous measurement of the germ spectrum of a flowing liquid or the droplet or particle content of a flowing gas as well as the magnitude and direction of the velocity at the location of the measured volume. It is even feasible to employ this apparatus for the germ spectrum measurements or aerosol measurements in a flow having known parameters because in that case the pulse width measurement can be used for the simple and accurate determination of the measured volume dimensions which, in turn, are required to determine the germ or aerosol concentration.

Various modifications are possible within the scope of the present invention. For example, it is conceivable that the diaphragm 5 and the neutral wedge filter 5a be combined to form a single structural unit. Naturally a linear neutral wedge filter 5a can be replaced by any other grey filter which mix the light intensity unsymmetrical over the laser beam cross-section in a manner known per se.

It is also conceivable that the diaphragm 5 and/or the neutral wedge filter 5a be made variable so that not only their rotary position but also their shape and thus the cross-sectional shape of the laser beam can be changed.

I claim:

1. A method of ascertaining the magnitude and direction of the flow speed in a flowing medium, characterized by the following steps:
   (a) irradiating the flow medium in a first direction with a laser beam of a defined cross-section having a maximum principal dimension;
   (b) observing a defined section of the laser beam in a second direction at a defined angle to the first direction through a predetermined observation cross section and thereby defining a measuring volume at the intersection of the laser beam and the observation cross-section;
   (c) measuring the pulse duration of diffuse light pulses given off in the second direction by particles of a defined size contained in the flowing medium and passing through the measuring volume; and
   (d) rotating the laser beam cross-section about the rotary axis defined by the first direction into a rotating position wherein diffuse light pulses of maximum pulse duration can be measured, whereby the maximum pulse duration and the rotary position of the laser beam cross section are a measure for the magnitude and the direction of the flow speed, respectively.

2. The method defined in claim 1, wherein following the observation and measurement of diffuse light pulses of maximum pulse duration, the rotary position of the laser beam cross-section used therefor is recorded, the laser beam direction (first direction) and the direction of observation (second direction) are interchanged and steps b to d are carried out with the first and second directions interchanged.

3. The method defined in claim 1, wherein the defined section (measuring volume) of the laser beam is observed through an observation cross-section with a maximum principal dimension and, following the observation of diffuse light pulses of maximum pulse duration, the observation cross-section is turned about the observation axis (second direction) until diffuse light pulses of maximum pulse duration are again measured.

4. Apparatus for determining the magnitude and direction of the flow speed in a flowing medium, comprising a laser for illuminating a limited measuring volume in the flowing medium, a receiving optical system which is disposed at a defined angle to the laser beam direction and which is directed to the measuring volume, a photo-multiplier to which the receiving optical system is adjusted, means downstream of the photo-multiplier for measuring the pulse width of the pulses given off by the photo-multiplier, and means for determining the position of the laser beam cross-section, said last-mentioned means being associated with the laser, rotatable about the laser beam axis and comprising an element shaping the laser beam cross-section, whereby light pulses received in the receiving optical system and transmitted therefrom to the photo-multiplier are translated into pulses, the width of which may be measured.

5. Apparatus as defined in claim 4, wherein the laser and receiving optical system are interchangeable in their mutual position.

6. Apparatus as defined in claim 4, wherein the receiving optical system comprises a slit diaphragm which is rotatable about the optical axis of the receiving optical system and the rotary position of which can be read off and/or scanned.

7. Apparatus as defined in claim 4, wherein the pulse width analyser is preceded by means scanning the rotary position of the slit diaphragm and means for compensating the pulse width variations occasioned by changes in the measured volume as a result of turning the slit diaphragm.

8. Apparatus as defined in claim 4, wherein the means for measuring the pulse width comprise a pulse width analyser.

9. Apparatus as defined in claim 8, wherein the photo-multiplier is followed by a single channel discriminator transmitting to the pulse width measuring means only pulses of a defined pulse height range.

10. Apparatus as defined in claim 9, wherein the element shaping the laser beam is associated with a grey filter of which the grey intensity increases or decreases in a defined direction, preferably in the direction of the principal dimension of the laser beam cross-section.

* * * * *